US010022645B2

(12) United States Patent
Kishi et al.

(10) Patent No.: US 10,022,645 B2
(45) Date of Patent: Jul. 17, 2018

(54) INFORMATION PROVIDING SYSTEM AND INFORMATION PROVIDING PROGRAM

(71) Applicants: BANDAI CO., LTD., Tokyo (JP); Monokoto. Inc., Kyoto (JP)

(72) Inventors: Kenichiro Kishi, Tokyo (JP); Yasuhito Yanagi, Tokyo (JP); Koichi Sano, Kyoto (JP)

(73) Assignees: BANDAI CO., LTD., Tokyo (JP); Monokoto. Inc., Kyoto (JP)

( * ) Notice: Subject to any disclaimer, the term of this patent is extended or adjusted under 35 U.S.C. 154(b) by 0 days.

(21) Appl. No.: 15/113,706

(22) PCT Filed: Dec. 16, 2014

(86) PCT No.: PCT/JP2014/083231
§ 371 (c)(1),
(2) Date: Jul. 22, 2016

(87) PCT Pub. No.: WO2015/114972
PCT Pub. Date: Aug. 6, 2015

(65) Prior Publication Data
US 2017/0007941 A1 Jan. 12, 2017

(30) Foreign Application Priority Data

Jan. 31, 2014 (JP) .................. 2014-017907

(51) Int. Cl.
*A63H 33/22* (2006.01)
*H04N 5/225* (2006.01)
(Continued)

(52) U.S. Cl.
CPC ............. *A63H 33/22* (2013.01); *A63F 13/00* (2013.01); *H04N 1/32192* (2013.01);
(Continued)

(58) Field of Classification Search
CPC .... A63F 13/00; A63H 33/22; H04N 1/32192; H04N 5/225; H04N 5/232; H04N 5/262; H04N 2201/327
See application file for complete search history.

(56) References Cited

U.S. PATENT DOCUMENTS

2002/0130955 A1* 9/2002 Pelletier ................. G03B 15/00
348/211.4
2011/0300939 A1* 12/2011 Mao .......................... G06T 7/74
463/36

(Continued)

FOREIGN PATENT DOCUMENTS

JP 2003-242168 A 8/2003
JP 2005-062748 A 3/2005
(Continued)

OTHER PUBLICATIONS

Morinaga, Yasuo, "Gazo Kaiseki Gijutsu ya Sensor Gijutsu o Riyo shita Mobile AR—Atarashii Keitai Denwa no Hyogenryoku to Sosakan no Teikyo-", NTT DoCoMo Technical Journal, Jan. 2011, vol. 18, No. 4, pp. 13 to 16, NTT DoCoMo, Inc., Japan.

(Continued)

*Primary Examiner* — Edward Park
(74) *Attorney, Agent, or Firm* — Alston & Bird LLP

(57) ABSTRACT

[Problem] To provide an educational toy which allows an observed action to be experienced artificially. [Solution] A toy system (900) is used by bringing a magnifying-glass type hand-held instrument (930) into contact with a page (912) of a main body portion (910) having a picture portion (914). The magnifying-glass type hand-held instrument (930) captures an image of the picture portion (914), and determines the location, within the image in said picture portion, that has been captured. From pre-stored image data of a picture image that is the same as the picture portion (914), image data for a part (a partial image) corresponding (Continued)

to the location being captured are then read out and are displayed on a touch panel (942). If the location being captured fulfills certain location conditions, one image element from image elements W41 to W49 is also selected as a special image and is displayed superimposed on the partial image.

13 Claims, 12 Drawing Sheets

(51) Int. Cl.
*H04N 5/232* (2006.01)
*A63F 13/00* (2014.01)
*H04N 5/262* (2006.01)
*H04N 1/32* (2006.01)

(52) U.S. Cl.
CPC .............. *H04N 5/225* (2013.01); *H04N 5/232* (2013.01); *H04N 5/262* (2013.01); *H04N 2201/327* (2013.01)

(56) References Cited

U.S. PATENT DOCUMENTS

| | | | |
|---|---|---|---|
| 2012/0272279 A1* | 10/2012 | Lim | H04N 21/23892 725/109 |
| 2012/0280893 A1* | 11/2012 | Holakovszky | G02B 27/017 345/8 |
| 2013/0300637 A1* | 11/2013 | Smits | G03B 35/18 345/8 |
| 2014/0198220 A1* | 7/2014 | Nakamura | H04N 5/23203 348/169 |

FOREIGN PATENT DOCUMENTS

| | | |
|---|---|---|
| JP | 2005-284882 A | 10/2005 |
| JP | 2009-503628 A | 1/2009 |
| JP | 2009-070076 A | 4/2009 |
| JP | 2011-209990 A | 10/2011 |
| JP | 2014-119994 A | 6/2014 |
| WO | WO 2007/123297 A1 | 11/2007 |

OTHER PUBLICATIONS

Morinaga, Yasuo, et al., "Special Articles on Mobile AR Technology: Mobile AR Using Image Analysis and Sensor Technologies Providing New Expressiveness and Operational Feel to Mobile Terminals", NTT DOCOMO Technical Journal, Mar. 2011, vol. 12, No. 4, pp. 11 to 4, retrieved from <https://www.nttdocomo.co.jp/english/binary/pdf/corporate/technology/rd/technical_journal/bn/vol12_4/vol12_4_004en.pdf> on Jul. 25, 2016.

International Searching Authority, International Search Report (ISR) and Written Opinion for International Application No. PCT/JP2014/083231, dated Jan. 27, 2015, 7 pages, Japan Patent Office, Japan.

Japan Patent Office, Notification of Reasons for Refusal for Application No. 2014-017907, dated Jun. 2, 2017, 6 pages, Japan.

* cited by examiner

[Figure 1]
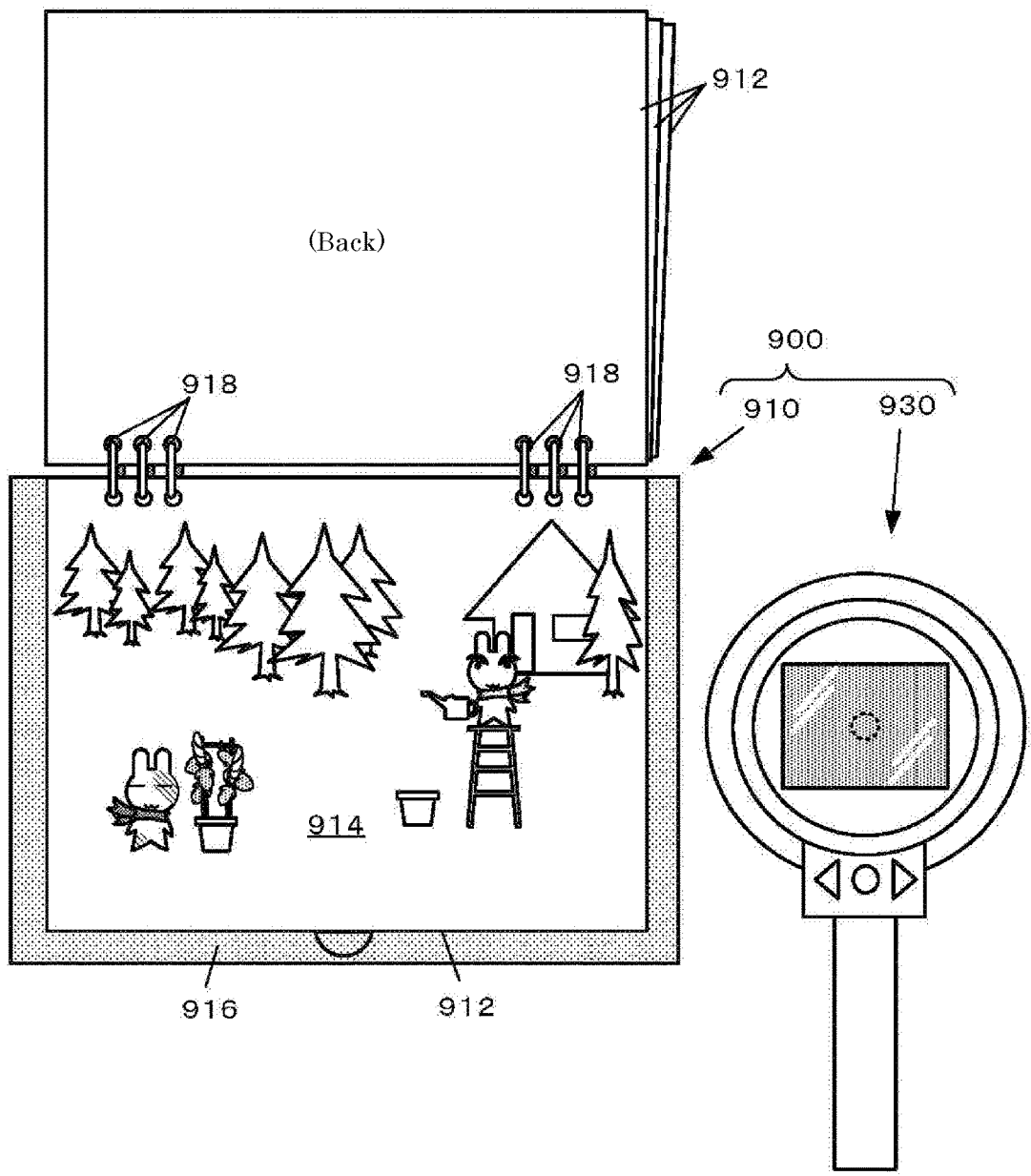

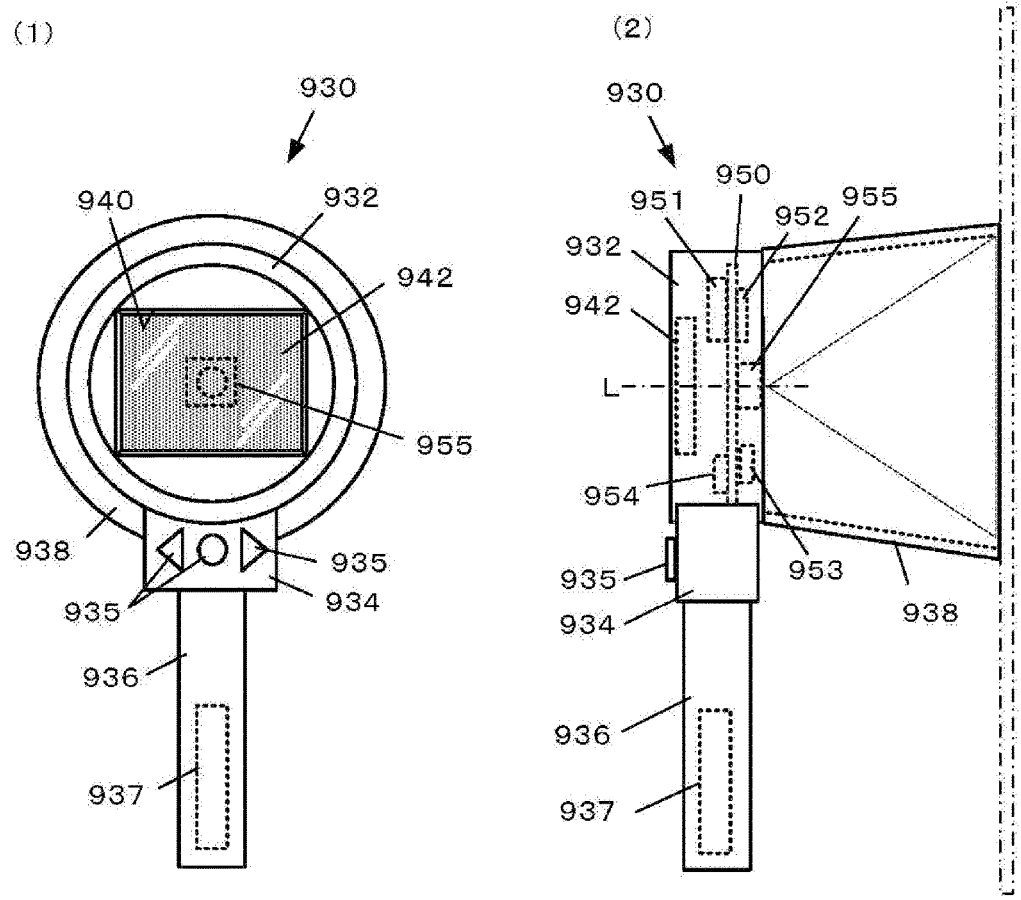
[Figure 2]

[Figure 3]
(1)
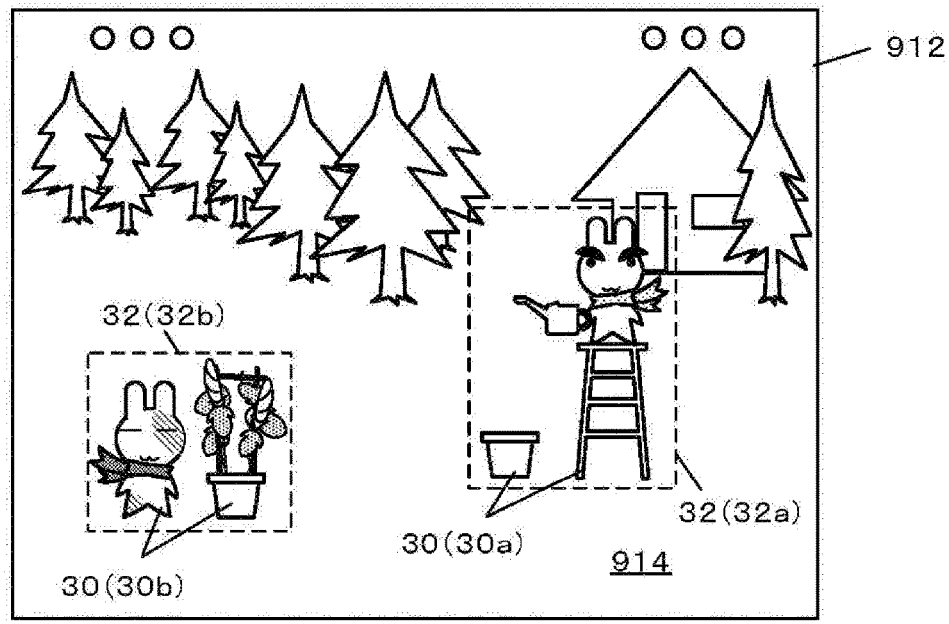
(2)
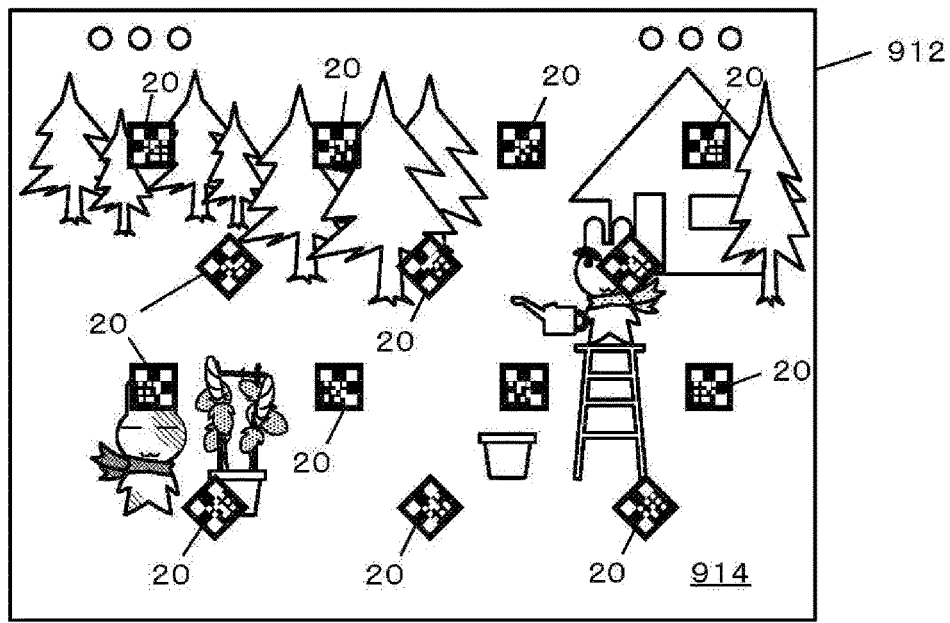

[Figure 4]
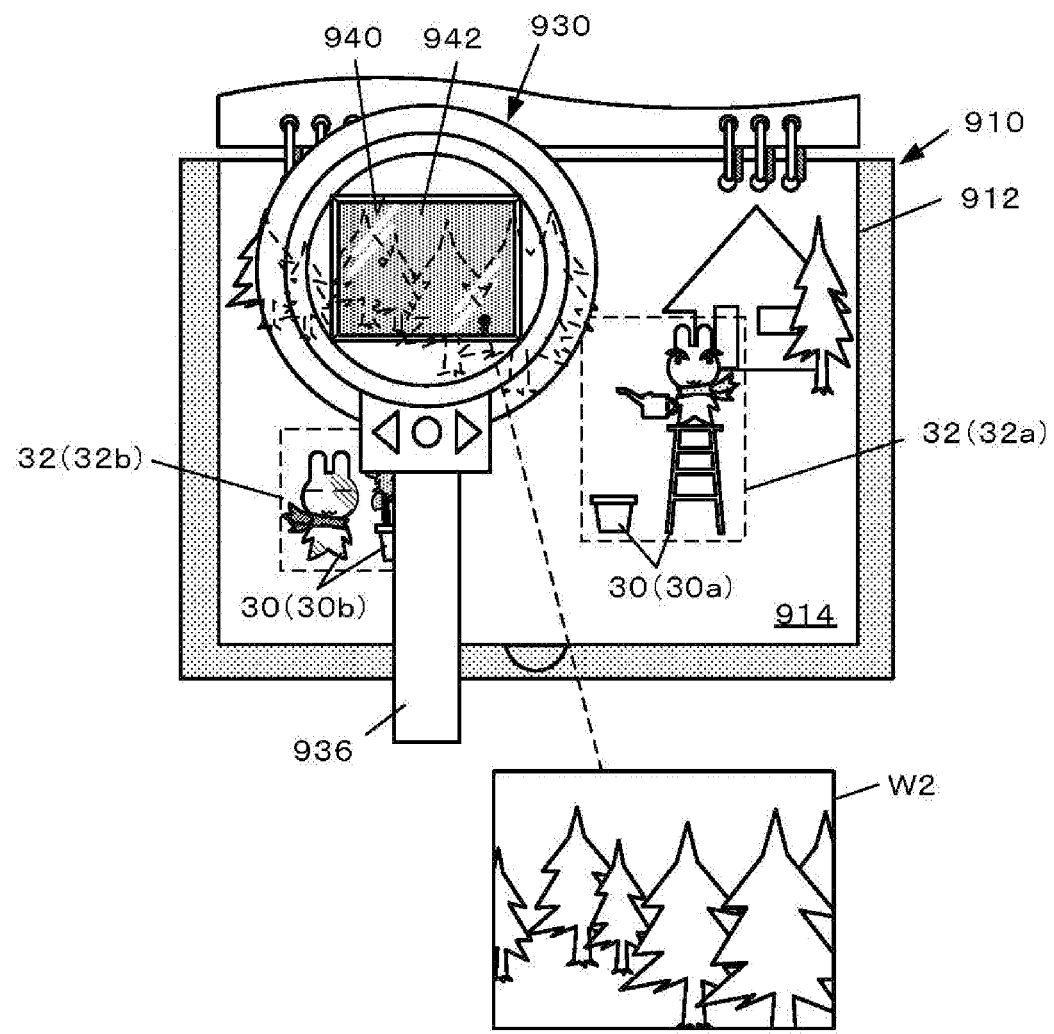

[Figure 5]
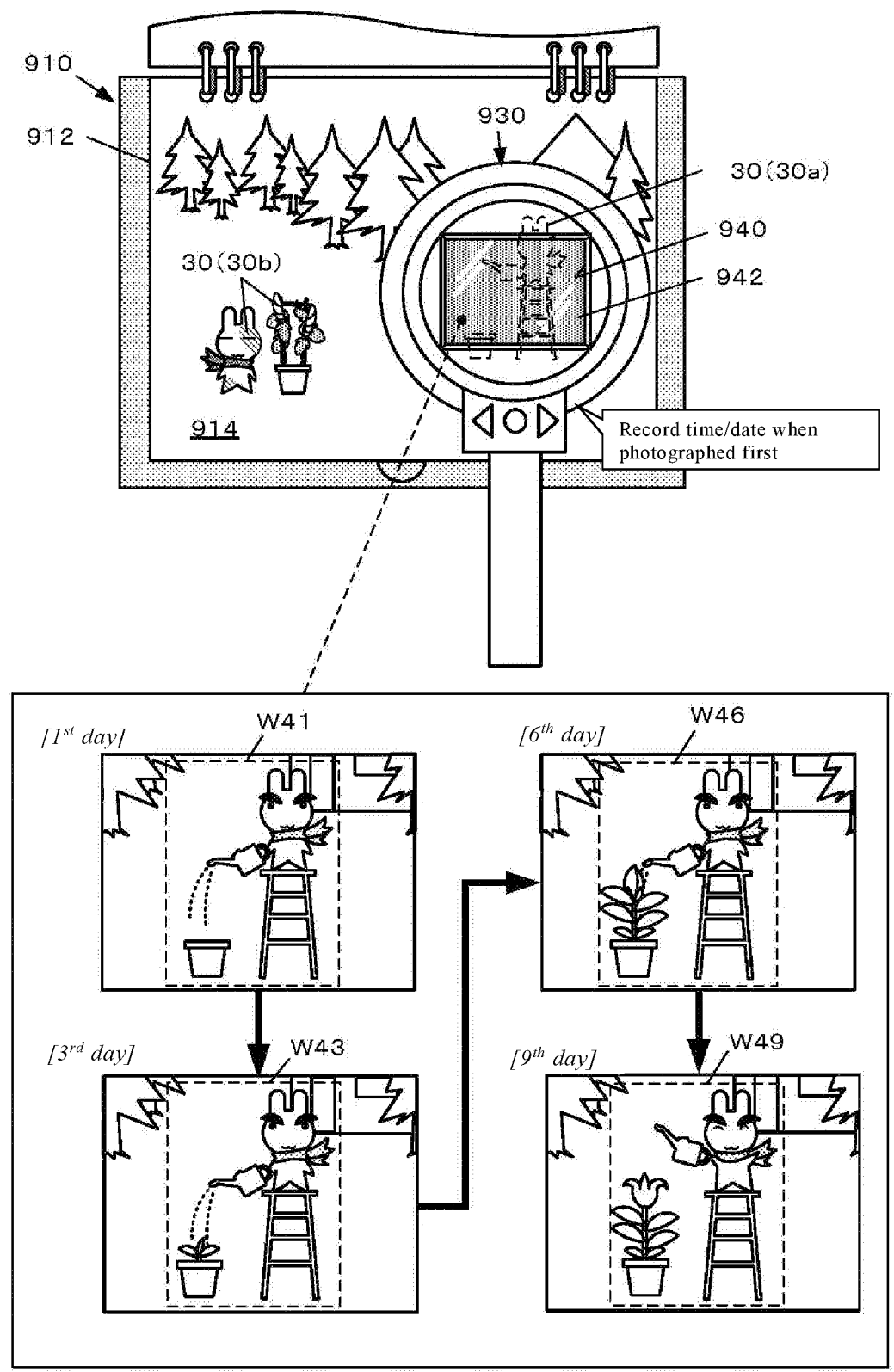

[Figure 6]
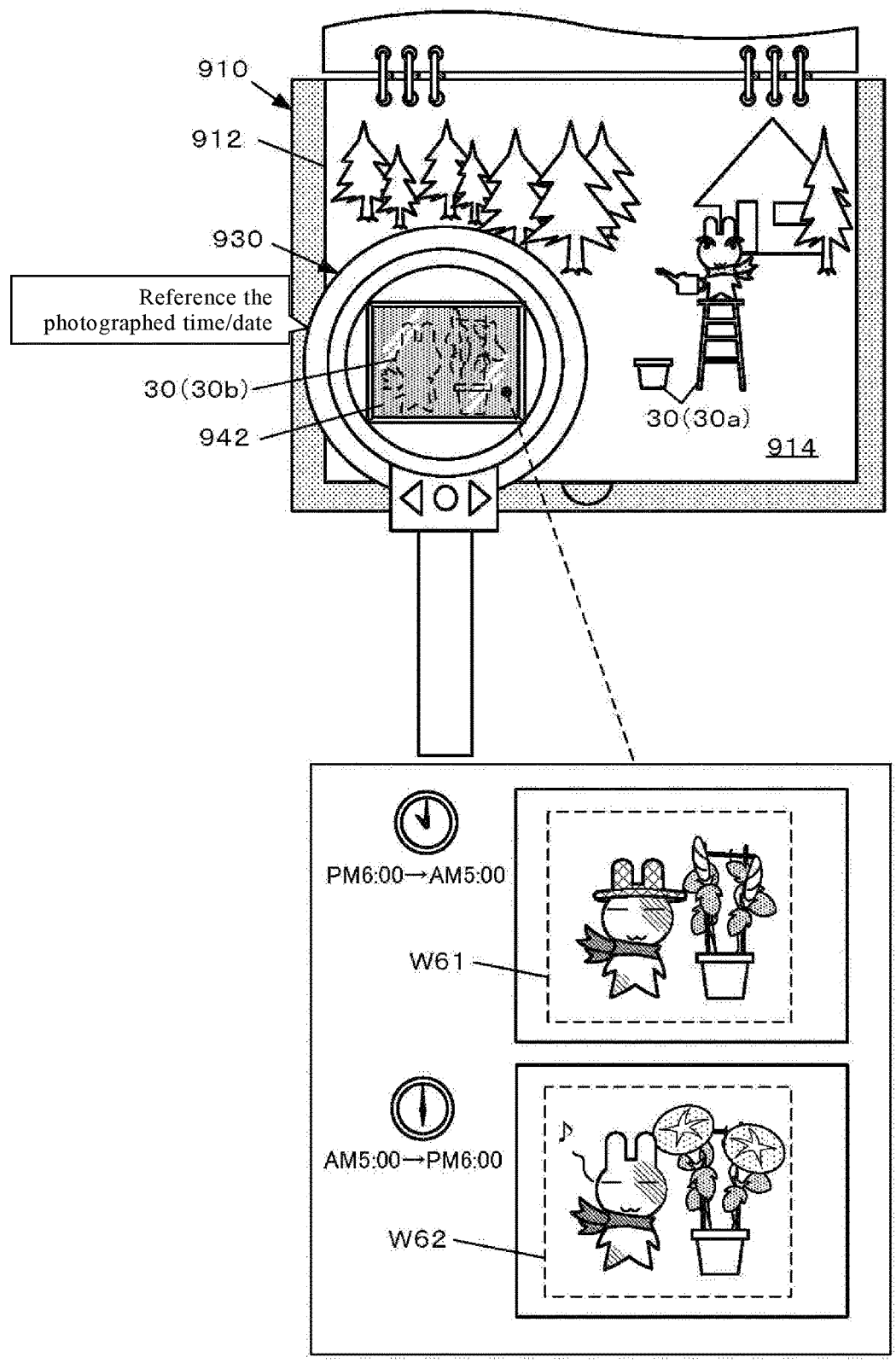

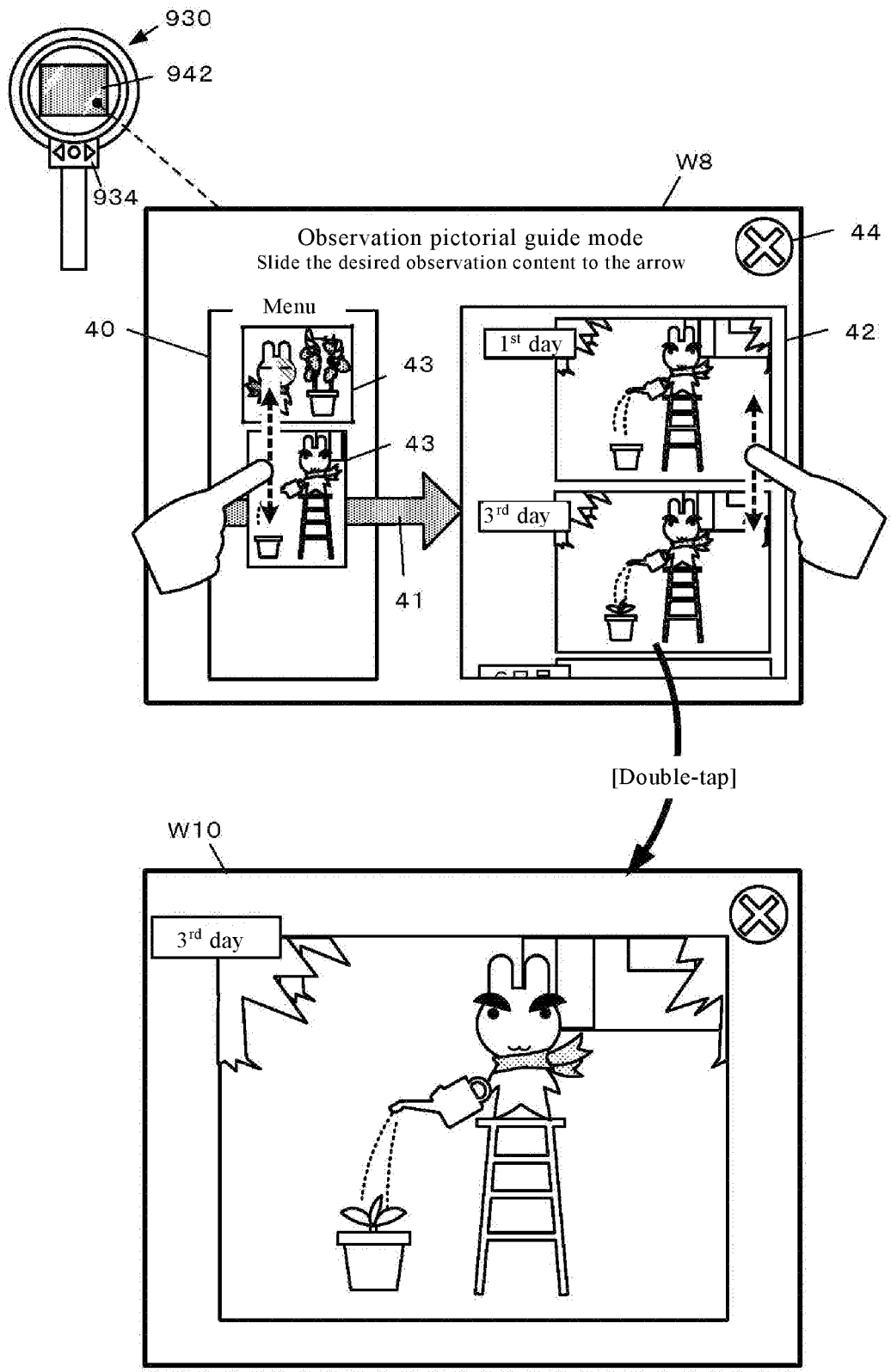
[Figure 7]

[Figure 8]
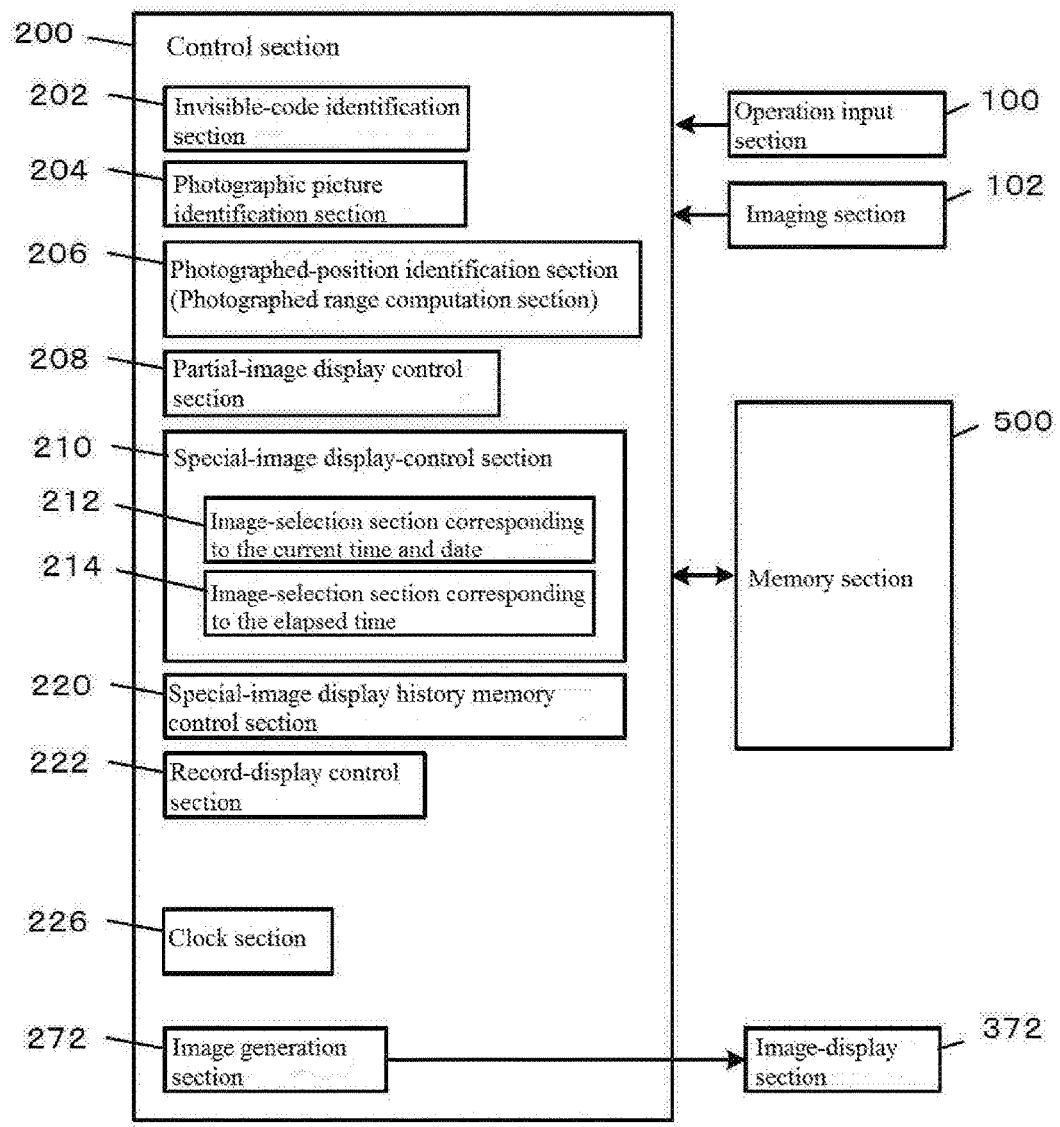

[Figure 9]
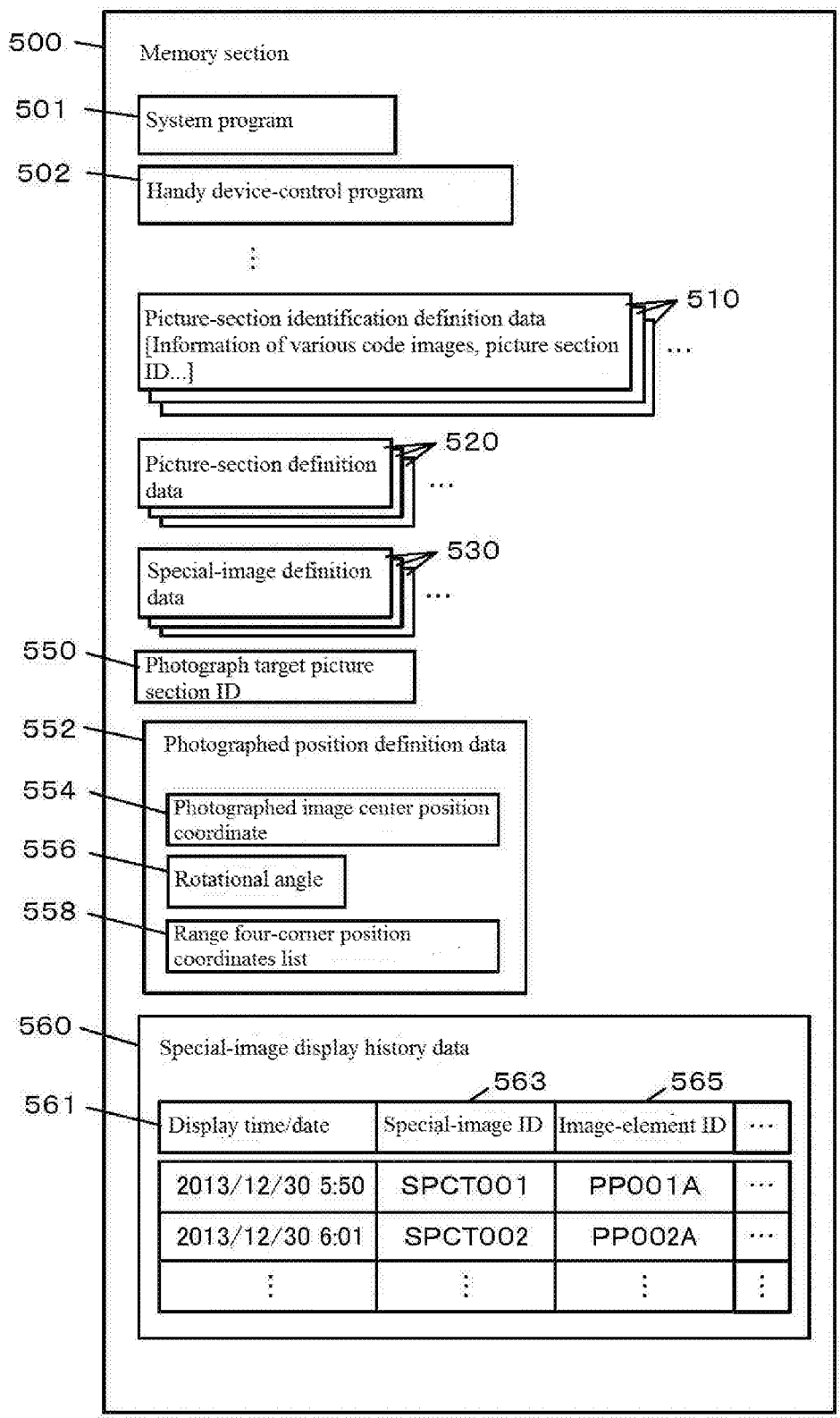

[Figure 10]
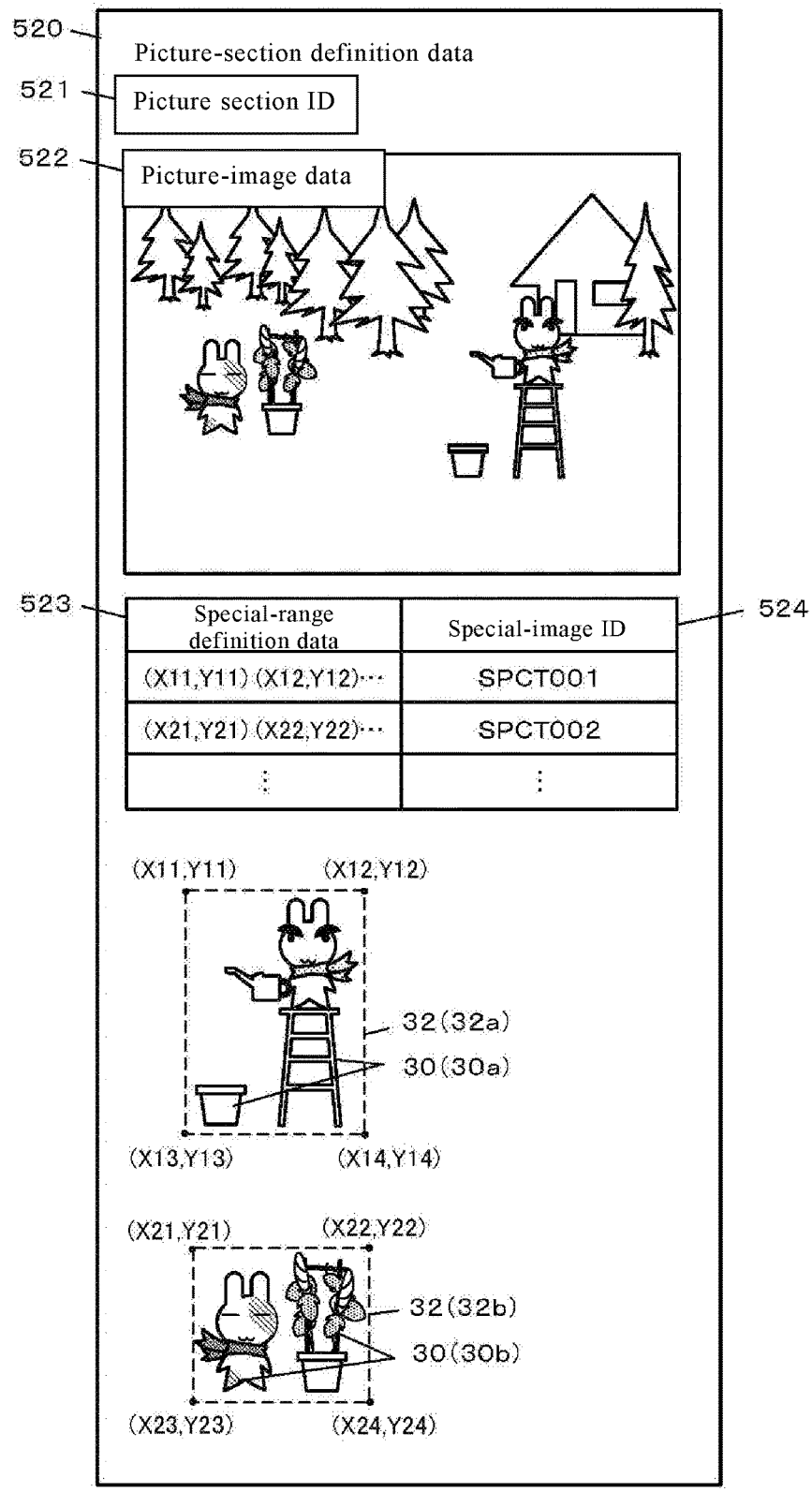

[Figure 11]
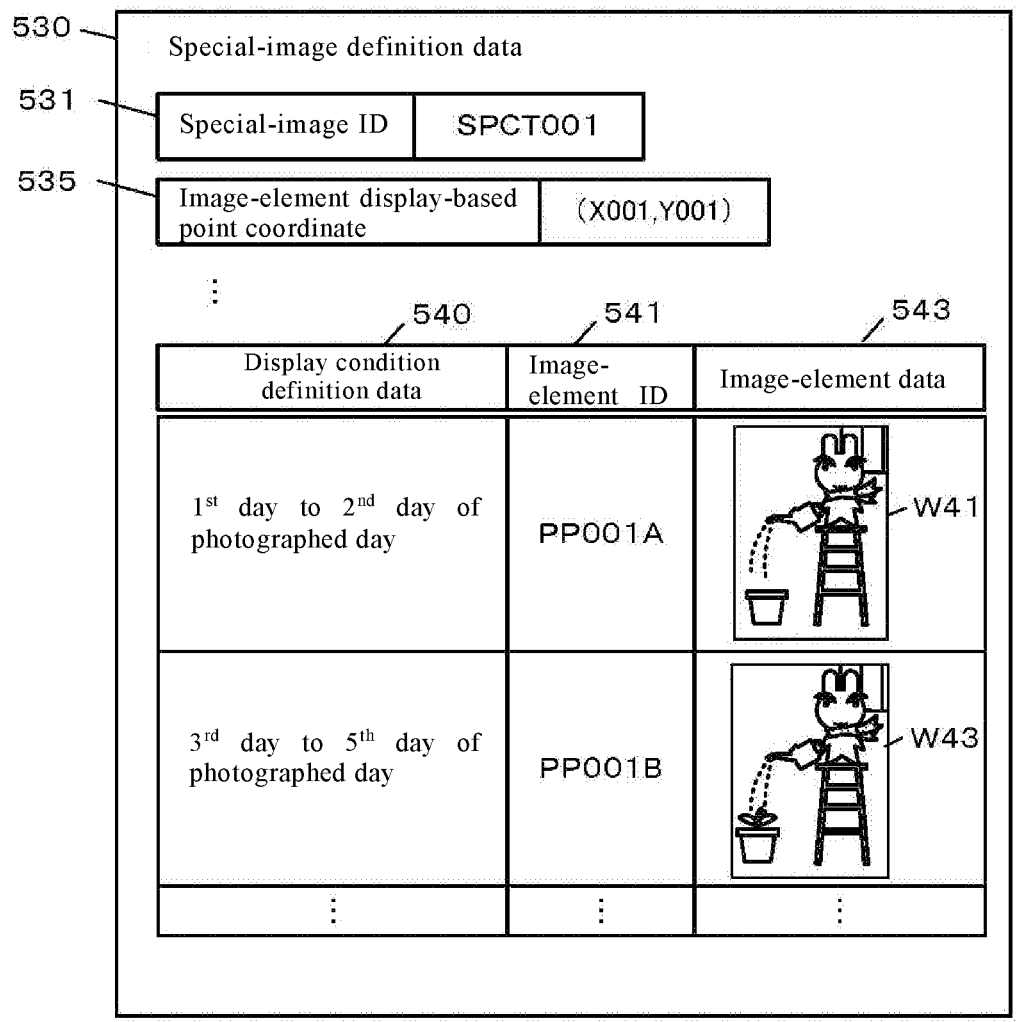

[Figure 12]
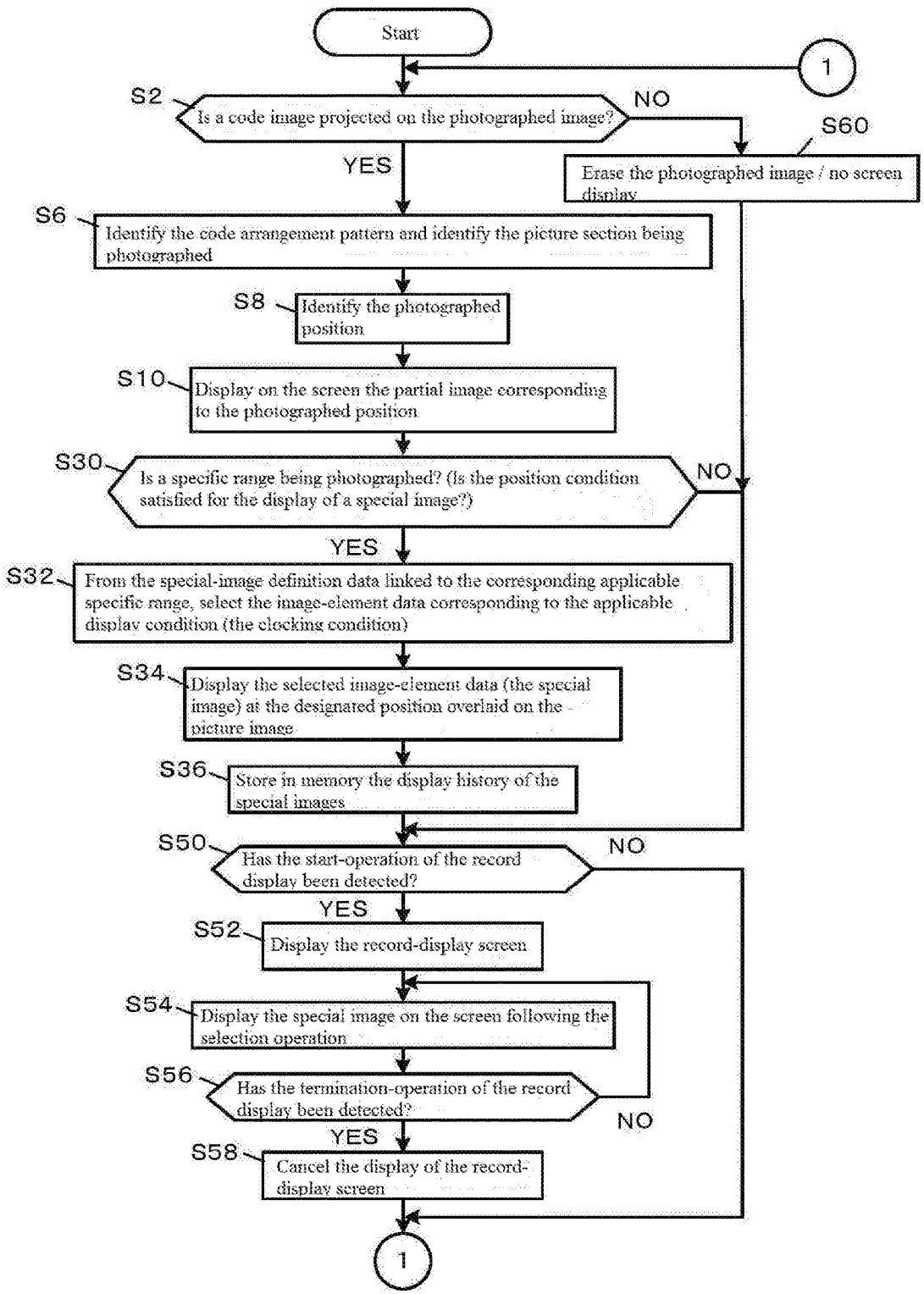

INFORMATION PROVIDING SYSTEM AND INFORMATION PROVIDING PROGRAM

CROSS REFERENCE TO RELATED APPLICATIONS

This application is a National Stage Application, filed under 35 U.S.C. § 371, of International Application No. PCT/JP2014/083231, filed Dec. 16, 2014, which claims priority to Japanese Application No. 2014-017907, filed Jan. 31, 2014; the contents of which are hereby incorporated by reference in their entirety.

BACKGROUND

Technical Field

This invention is related to the information presentation system.

Description of Related Art

There are proposed technologies that present information using codes that are invisible to humans.

For example, Japanese Unexamined Patent Application Publication No. 2003-242168 ("JP2003-242168") describes the technology that presents information using a head-mounted display. The head-mounted display described in said literature has a half-mirror in the optical path for the user to see the external scene, and it has a photo-receiver device (image sensor) that can photograph the external scene reflected by the half-mirror. When the user wears this head-mounted display and sees the displayed object (embedded with invisible codes), the image photographed with the image sensor corresponding to the invisible code is read from the server system and the image is projected on the half-mirror by the image-display device installed in the head-mounted display.

BRIEF SUMMARY

According to JP2003-242168, the user wearing the head-mounted display can see the image, which does not originally exist, overlaid on the displayed object. Separately from significance of information presentation, the experience of seeing on the screen the objects that normally cannot be seen with the naked eye in the real world is very impressive to anyone. It is not difficult to imagine how deeply children would be impressed. It seems that it is worthwhile to utilize this effect in the intellectual training of children.

The purpose of this invention is to provide the information presentation system and associated program with enhanced attractiveness.

The information presentation system of this invention is equipped with a portable electronic device (such as the handy loupe-type device 930 in FIG. 1) that consists of an information section (such as the picture section 914 in FIG. 1) listing information, an imaging section (such as the camera module 955 in FIG. 2), a display section (such as the touch panel 942 in FIG. 2), a memory section (such as the semiconductor memory incorporated in the IC memory 952 and SoC 951 in FIG. 2) and a control section (such as the control board 950 and SoC 951 in FIG. 2). When the imaging section recognizes the information section, the image is drawn in the information section in such a way that the photographed position in the information section can be identified on the basis of the recognized image. The memory section stores the image data (such as the picture-image data 522 in FIG. 10) for the display of the partial image from the information section in the display section. By identifying the photographed position in the information section based on the image recognized by the imaging section, the control section controls the display of the partial image in the information section corresponding to the photographed position in the display section, doing so on the basis of the image data (such as step S10 in FIG. 12).

Furthermore, in the information presentation system of this invention it is preferable that when the position condition for the display of the special image designated by the photographed position is satisfied, the control section will display the special image (such as the no. 1 image element W41 of the special image in FIG. 5) atop the partial image being displayed by the display section (such as steps S30 through S34 in FIG. 12).

Furthermore, in the information presentation system of this invention it is preferable that the portable electronic device be equipped with a clocking section (such as the clock section 953 in FIG. 2), and that the control section variably controls the special image based on clocking information provided by the clocking section (such as step S32 in FIG. 12).

Furthermore, in the information presentation system of this invention it is preferable that the control section stores the history of the special images displayed in the display section (such as the special-image display history data 560 in FIG. 9) and that the control section has the record-display control section with which to display the past displayed special images in the display section (such as the record-display control section 222 in FIG. 8 and steps S50 through S56 in FIG. 12).

Furthermore, in the information presentation system of this invention it is preferable that the information section configures the close-up photographed image with a plurality of different images corresponding to the photographed position.

Furthermore, in the information presentation system of this invention it is preferable that the information section be configured with images in which the code image (such as the code image 20 in FIG. 3), being invisible to the naked eye, is embedded with the designated layout rules.

Furthermore, in the information presentation system of this invention it is preferable that the portable electronic device has the loupe-shaped peep window and that the display section is installed at the peep window.

Furthermore, this invention is related to the information presentation program (such as the handy device-control program 502 in FIG. 9) that lets a computer, being equipped with the imaging section and the display section, function as a photographed-position identification means that identifies the photographed position in the information based on the image recognized by the imaging section when the imaging section recognizes the information listed in the information section (such as the control section 200 and the photographed-position identification section 206 in FIG. 8 and in step S8 of FIG. 12), and, as a partial-image display control means that controls the display in the display section, the partial images in the information section that are stored in the computer based on the photographed position identified by the photographed-position identification means (such as the control section 200 and the partial-image display control section 208 in FIG. 8, and step S10 of FIG. 12).

Furthermore, in the information presentation program of this invention it is preferable that the computer functions as a photographed-position condition identification means that identifies the position condition of the photographed position and as a special-image display control means that controls the display of the special image on the partial-image displayed in the display section when the position conditions satisfies the position condition to display the designated special image.

Furthermore, in the information presentation program of this invention it is preferable that the computer has the clocking section and that the computer functions as a clocking-information-based image-selection means that controls variable display of the special images based on the clocking information from the clocking section.

Furthermore, in the information presentation program of this invention it is preferable that the computer functions as a special-image display history memory means that stores the history of the special images displayed in the display section into the memory section and as a record-display control means that controls the display of past displayed special images in the display section based on the history.

Furthermore, in the information program system of this invention it is preferable that the photographed-position identification means identifies the photographed position by matching the pattern of the images in the picture images.

Furthermore, in the information program system of this invention it is preferable that the photographed-position identification means identifies the photographed position by using the code image (which is invisible to the naked eye) in the picture images.

BRIEF DESCRIPTION OF DRAWINGS

FIG. 1 is a view that illustrates the configuration of a toy system for children.

FIG. 2 is a view that illustrates the configuration of the handy loupe-type device.

FIG. 3 is a view that illustrates the configuration of the picture section.

FIG. 4 is an explanatory view of an image display example on the handy loupe-type device.

FIG. 5 is an explanatory view of an image display example on the handy loupe-type device when a special range is included in the photographed image.

FIG. 6 is an explanatory view of an image display example on the handy loupe-type device when a special range is included in the photographed image.

FIG. 7 is a view that illustrates a screen display example in the observation pictorial guide mode.

FIG. 8 is a functional block diagram that illustrates the example of functional configuration of the handy loupe-type device.

FIG. 9 is a view that illustrates programs and data stored in the memory section of the handy loupe-type device.

FIG. 10 is a view that illustrates the data configuration of the picture-section-defined data.

FIG. 11 is a view that illustrates the data configuration of the special-image definition data.

FIG. 12 is a flow chart describing the flow of the process in the handy loupe-type device.

DETAILED DESCRIPTION

Hereinafter, embodiments for carrying out this invention will be described. However, it should be noted that embodiments of this invention are not limited to examples given below.

FIG. 1 is a view that illustrates the configuration of a toy system 900 for children. The toy system 900 of the embodiment of this invention has the main body section 910 and the handy loupe-type device 930.

The main body section 910 is a book consisting of a plurality of pages 912 equipped with the picture section 914. In this embodiment of this invention, it is the so-called "ring file" in which a plurality of removable pages 912 is bound by the ring 918 in the binder frame 916. However, this can be a notebook or a book type that is hard-bound by glue or cord.

The number of pages 912 can be suitably set, and a page 912 can be a folding type. In the example, the configuration shows one picture section 914 on one page 912. However, a plurality of picture sections 914 can be configured on one page 912, or one picture section 914 can be configured across a plurality of pages 912, the so-called "spread book" configuration. The picture section 914 can be printed on each page 912, or it can be pasted on each page 912 as a seal sheet.

The handy loupe-type device 930 is an electronic device equivalent to a computer having the external appearance of a loupe. The user holds the device like a loupe and peers into the picture section 914.

FIG. 2 is a view that illustrates the configuration of the handy loupe-type device 930 of the embodiment of this invention. FIG. 2 (1) is a frontal view facing the user, and FIG. 2 (2) is a side view.

The external appearance of the handy loupe-type device is the shape of a loupe. More specifically, the rod-shaped handle 936 is extended from the side of the disk-type housing section 932 through the medium of the operation section 934. At the back of the disk-type housing section 932, the semi-cylindrical-shaped lighting-skirt section 938 made of transparent resin or semi-transparent resin is provided. It is preferable that the length of the handle 936 be set in such a way that when the lighting-skirt section 938 is placed on the picture section 914, it can stand by itself without falling.

At the center of the front side of the disk-type housing section 932, the peep window 940 is installed and the touch panel 942 is embedded.

The control board 950 is built into the disk-type housing section 932. Mounted on the control board 950 are, for example, SoC (System-on-Chip) 951, IC memory 952, the clock section 953, the touch-panel driver IC 954 for operating the touch panel 942, and the camera module 955. These function through means of electrical power from the built-in battery 937 stored in the handle 936.

The CPU built in the SoC 951 integrally controls the operation of the handy loupe-type device 930 by reading the program and data stored in the IC memory 952 and by computing.

The program and various data are stored in the IC memory 952. Included among various data is the image data of the picture image of the picture section 914 printed on each page 912.

The clock section 953 is a real-time clock IC built in a typical PC, and as always it clocks the current time and date and outputs to SoC 951. Of course, it is acceptable to implement the clock section 953 as a software clock in which SoC 951 computes the time and date based on the clock signal. It is preferable to have a clocking section that clocks at least one of time, date or season.

The camera module 955 is a well-known image sensor that contains the optical elements such as lenses, filters, and the sensor chip that generates the photographed image data and outputs to SoC 951. The camera module 955 of the embodiment of this invention can photograph the visible-light region as a matter of course but also invisible areas such as infrared region or ultraviolet region. The camera module 955 is installed in such a way that it can photograph objects at the back side of the disk-type housing section 932 and so that its optical axis L runs through the center of the screen of the touch panel 942. The optical specification, including the focus distance, is set in such a way that the close-up photograph is possible, whereby the camera can be focused on the object pushed against the edge surface of the lighting-skirt section 938. It is acceptable to provide the auto-focusing function. In this embodiment, the infrared transmission filter is provided at the front of the camera module 955. The infrared transmission filter in this embodiment is for the camera module 955 to efficiently recognize the infrared ray reflected by the visible printing section. It is not restricted to anything particular as long as the material can absorb the visible light and pass through the infrared ray.

The operation section 934 comprises a plurality of operation switches 935 for the user to input operations.

FIG. 3 is a view that illustrates the configuration of the picture section 914 of this embodiment of this invention.

In this embodiment, the picture section 914 is the image content. The picture images categorized as illustrations are provided as examples, but categories are not limited to these as long as listed information has the information section, such as photographs, typography, etc. It can also be character information (to be included in "image" in this embodiment). It can be a two-dimensional image or stereoscopic image.

The picture section 914 is comprised of the visible print section that is printed with normal visible ink reflecting the infrared ray and the invisible print section that is printed with the infrared ray absorbing ink invisible to the naked eye of the user. In this embodiment, for example, the invisible print section is printed with the paint with high light absorption rate for the ray in the near infrared region. If only the visible print section is graphically illustrated, it is as shown in FIG. 3 (1). This is the image visible to the naked eye of the user, that is to say the figure of the picture section 914 in the visible-light region. In addition, if the invisible print section is graphically illustrated schematically, it will be as shown in FIG. 3 (2).

The visible print section of the picture images of the picture section 914 contains a single or a plurality of observation objects 30 (two locations in the example illustration, the observation object at right 30a and the observation object at left 30b). The observation object 30 will be defined by a unique specific range 32 (two locations in the example illustration, the specific rage 32a at right and the specific range 32b at left) in each data. The specific range 32 in this embodiment is a rectangular region surrounding the observation object 30, being defined by the coordinates of the four corners in the picture-image coordinate system.

The invisible print section is comprised of a plurality of code images 20 arranged by the designated layout rules so that the photographed position of the picture image can be identified on the basis of the photographed image when the camera module 955 takes a photograph. In other words, the code images 20 invisible to the naked eye are embedded in the picture image of the picture section 914. Furthermore, "photographing" in this embodiment includes not only the acts of recording images as photograph or video but also all other acts of image recognition by the camera module 955.

Because the code image 20 is printed with the invisible infrared-absorbent ink and the visible print section is printed with the ink reflecting the light in the infrared region, if a photograph is taken by the camera module 955 with the infrared transmission filter, the code image 20 can be recognized and identified as illustrated in FIG. 3 (2). In this embodiment, it is preferable that the infrared light source for radiating the infrared ray is installed at the picture section 914 and that the identification rate of the code image 20 be further improved. For example, the infrared LED is installed at the back of the disk-type housing section 932, and the infrared light is radiated toward the object being photographed by the camera module 955.

Each code of the code image 20 supports its unique information. A plurality of codes is arranged according to designated rules. More specifically, the code images 20 of proper posture are placed at a designated spacing in the first row from the top. In the second row from the top, the code images 20 of the tilted posture rotated 45° counter-clockwise from the proper posture are placed at a designated spacing, i.e., half-spacing offset from the code images 20 in the first row. In the third row from the top, the code images 20 are place, being flipped left and right in relation to the first row. In the fourth row from the top, the code images 20 of the tilted posture are rotated 45° counter-clockwise from the proper posture, as in the second row, and are placed at a designated spacing, i.e., half-spacing offset from the code images 20 in the third row. The number of code images 20 in the row or the number of rows can be set appropriately. However, when taking a close-up photograph by having the lighting-skirt section 938 butted against the picture section 914, the layout rules (including the number of rows) for the code image 20 should be defined so that at least one code image 20 is included in a photographed image. This is for the purpose of understanding the photographed position and the photographed angle on the basis of the code image 20 in the photographed image. It is preferable to have at least two code images 20 in a photographed image because the photographed position can be more accurately computed by identifying more than two code images 20.

Because each code image 20 supports unique information and some of code images 20 are arranged in the tiled posture, it is possible to know which portion of the picture image of the picture section 914 is being photographed by identifying and decoding the code image projected on the image photographed by the camera module 955. In other words, it is possible to know the photographed position as well as the center-position coordinates of the photographed image in the picture-image coordinate system.

The code pattern (the code information) of the printed code image 20 contains unique information for each page 912, that is, for each picture section 914, the position information in the picture section 914, and the information indicating in which direction the code image 20 is printed with respect to the picture section 914. Additionally, the code image 20 itself has the direction. Therefore, from the photographed code image 20, it is possible to know which picture section 914 and which position in the picture section 914 the camera module 955 is photographing in terms of rough position and angle (clockwise/counter-clockwise rotation angle with respect to facing the page 912). Also from the distance between two or more photographed code images, it is possible to know which detailed position in the picture section 914 is being photographed.

The purpose of the invisible print section is to enable the identification of the photographed position in the picture image based on the photographed image when taking a close-up picture image using the camera module 955. In other words, it is intended to provide the ability to identify the photographic position or the range in the picture image, or the identification of the representative position for use in defining the applicable range.

Therefore, the configuration of the invisible print section need not be limited to what is described in this embodiment, and, for example, the configuration can be in such a way that the identification information is defined by the dot distribution. Additionally, it can consist of code images or can be a dot distribution drawn with normal visible ink. Alternatively, if the content of the picture image of the visible print section photographed using the camera module 955 is successively identified using the image-pattern recognition, it can be configured to identify the photographic position or the range, or it can be the representative position for defining the applicable range. In this case, the invisible print section, the infrared transmission filter, the infrared light source and others can be eliminated. It is ideal.

FIG. 4 is an explanatory view of an image display example on the handy loupe-type device 930.

The user holds the handle 936 of the handy loupe-type device 930 as if to observe an insect with the loupe, and places the handy loupe-type device 930 on the picture section 914 in such a way that the edge of the lighting-skirt section 938 (see FIG. 2) touches the page 912. Then, the user peers into the window 940.

The handy loupe-type device 930 successively takes photographs of the page 912 with the camera module 955, detects the code images 20 in the photographed images, and analyzes the detected code images 20. Then, from the code images 20 in the photographed image, it identifies which picture section 914 is being photographed, which position in the picture section 914 is being photographed and from which angle it is being photographed.

As described earlier, the IC memory 952 of the handy loupe-type device 930 contains, in memory, the image data, which is the same as the image data of all picture sections 914, so that any image of the picture section 914 can be displayed in the display section. The handy loupe-type device 930 extracts from the IC memory 952 the partial image W2 of the picture in the picture section 914 currently being photographed, doing so by matching the range with the photographed range, and displays the partial image W2 on the touch panel 942. In other words, the image of the picture section 914 being photographed will not be displayed on the touch panel 942 of the handy loupe-type device 930. Instead, through the touch panel 942, the user peering into the window 940 will see the partial image W2 of the of the picture section 914 where the handy loupe-type device 930 is touching. In the example shown in FIG. 4, the partial image W2 of the woods is displayed because the handy loupe-type device 930 is touching the woods at the upper-left area of the image. If the handy loupe-type device 930 is slid, the partial image W2 being displayed will also be scrolled to tack the change. As far as the user is concerned, the user feels as if the touch panel 942 is the lens of the loupe.

Furthermore, in this embodiment the partial image W2 extracted from the IC memory 952 needs not totally match the content of the image itself as long as the contour of the partial image W2 matches the contour of the image being photographed. For example, it is acceptable to have the partial image W2 colored differently from the image being photographed, or to have images added for special effects. By making the partial image different from the image being photographed, the display becomes more interesting and the attractiveness of the handy loupe-type device 930 is enhanced.

Furthermore, this may be a repetitive explanation, but the photographed image itself will not be displayed on the touch panel 942 of the handy loupe-type device 930. The partial-image displayed on the touch panel 942 is the portion of the picture-image data stored in the IC memory 952 corresponding to the photographed range identified from the photographed image. As in this embodiment, only the picture-image data stored in the IC memory 952 is displayed in the display section, and the code images, which would normally be displayed in the display section, will not be displayed in the display section. Therefore, it is not necessary to worry about code images being projected in the display section. This will allow the use of a simple configuration for the picture images of the picture section and will enhance the freedom of designing code images.

FIGS. 5 and 6 are an explanatory view of an image display example on the handy loupe-type device 930 when the specific range 32 is included in the photographed image.

When it is judged that all or a part of the specific range 32 is included in the photographed image taken by the camera module 955, the handy loupe-type device 930 displays, on a partial image, the "special image" related to the observation object 30 corresponding to the specific range 32. In other words, when it is judged that the photographed position satisfies the designated position condition, a special image will be displayed on the partial image.

The "special image" is configured with a single or a plurality of image elements expressing different appearances of the observation object 30 in the picture image being photographed. The definition data of the special image corresponding to the specific range 32 is stored in advance in the handy loupe-type device 930. The image-element data for each "display condition" is stored in the definition data. In this embodiment, an image element configuring the special image can be animation (video) or a still image. Depending on the method of setting the "display condition", there are two types of special images in this embodiment.

In the example of FIG. 5, the "display condition" is the type in which the elapsed time is set, starting with the first time the specific range 32 is photographed.

In the example of FIG. 5, the observation object 30*a* at the right side of the picture section 914 is drawn with the potted plant and the character depicting the rabbit with eyebrows that is nurturing the plant, but the potted plant has no bud yet. During the first day and second day from the time the specific range 32*a* of the observation object 30*a* is first photographed, the no. 1 image element W41 that animates the rabbit watering the pot is selected as the special image and is displayed on the touch panel 942. During the elapsed time of the third day to fifth day, the no. 2 image element W43 animating the plant budding is selected and displayed. During the elapsed time of the sixth day to eighth day, the no. 3 image element W46 depicting the plant having buds is selected and displayed. For the elapsed time of the ninth day and beyond, the no. 4 image element W49 depicting the flower blooming is selected and displayed. In this explanation, the special image is comprised of 4 types of image elements, however additional image elements can be prepared such as scenes in-between the elapsed time presented or scenes beyond the no. 4 image element W49 (for example, the withered flower forming seeds, the overall plant wilted away).

In the example of FIG. 6, the current date and time being photographed is set as the "display condition". For example, the season, month, day of the week, date, time frame, time of the day, holiday identification (such as Children's day), the summer recess, and Christmas period can be appropriately set as the display condition. Then, the image element of the special image corresponding to the display condition of the current time is selected and displayed.

In the example of FIG. 6, the observation object 30b at the left side of the picture section 914 is drawn with the potted plant of morning glory and the character depicting the spotted rabbit that is watching the plant, but the flower in the pot is not blooming. If the time of the day when the user is using the handy loupe-type device 930 is between 6 pm and 5 am next morning, then the no. 1 image element W61 (the same content as the photo being photographed by the camera module 955) corresponding to this time frame is displayed. However, if the time when the user is using the handy loupe-type device 930 falls between 5 am and 6 pm, the no. 2 image element W62 (the scene of flower blooming) corresponding to this time frame is displayed.

In this explanation, the special image is comprised of two types of image elements corresponding to the specific range 32b, however additional image elements can be prepared for multiple time frames such as scenes in-between the time frames presented or scenes beyond the no. 2 image element W62 (for example, the scene of closed flower pedals after sunset).

The handy loupe-type device 930 stores the image display history of the special images as displayed in FIGS. 5 and 6, and the user can re-display any special-image displayed before at any time. This is called the "record display function", but because the expected users are children, it may be more appropriate to call it as the "observation pictorial guide mode".

FIG. 7 is a view that illustrates a screen display example in the observation pictorial guide mode.

If the designated record display start time operation is input at the operation section 934 or the touch panel 942, the handy loupe-type device 930 will display the record-display screen W8. The record-display screen W8 contains the menu-display section 40, the specified-position display section 41, and the record-display section 42.

In the menu-display section 40, the scrollable thumbnail 43 of the special images displayed in the past are displayed sorted by the observation objects 30. The user slides the thumbnail 43 of the special image that he wants to display to the specified-position display section 41.

The handy loupe-type device 930 displays the scrollable special images, that were displayed in the past, corresponding to the thumbnail 43 that is slid to the specified-position display section 41, at the record-display section 42 sorted by image elements. If a touch operation is detected at the image element of the record-display section 42, the image element will be expanded in display as shown in the screen display example W10.

On the record-display screen W8, the record-display termination operation icon 44 is provided. If this icon is touched or a designated operation is performed at the operation section 934, the display of the record-display screen W8 can be terminated.

Furthermore, in this embodiment the voice output section can be provided on the handy loupe-type device 930. The handy loupe-type device 930 will be more appealing to the users if the voice output is provided accompanying the image display in the display section.

Explanation of Functional Configuration

FIG. 8 is a functional block diagram that illustrates an example of the functional configuration of the handy loupe-type device 930.

The handy loupe-type device 930 of this embodiment comprises the operation input section 100, the imaging section 102, the control section 200, the image-display section 372, and the memory section 500.

The operation section 100 outputs the operation input signal to the control section 200 according to various input operation performed by the player. The operation input signal can be generated by, for example, the push switch, joy stick, touch pad, track ball, acceleration sensor, gyro, etc. In the example given in FIG. 2, the operation switch 935 or the touch panel 942 falls under this.

The imaging section 102 outputs the photographed image data to the control section 200. In the example of FIG. 2, the camera module 955 falls under this.

The control section 200 is implemented, for example, with the SoC or the microcontroller IC that integrates the CPU, GPU and semiconductor memories on a single semiconductor element, and controls input and output of data between various functional sections including the operation input section 100, the imaging section 102 and memory section 500. It performs various computational processes based on designated program and data, the operation input signal from the operation input section 100, image data from the imaging section 102, and controls integrally the action of the handy loupe-type device 930. In the example of FIG. 2, it is included in the control board 950.

The control section 200 in this embodiment contains the invisible-code identification section 202, the code identification section 204, the photographed-position identification section 206, the partial-image display control section 208, the special-image display-control section 210, the special-image display history memory control section 220, the record-display control section 222, the clock section 226 and the image generation section 272.

The invisible-code identification section 202 analyzes the image data photographed by the imaging section 102, detects the code image 20 projected in the image, and identifies the code pattern or the orientation of code image 20.

The photographic picture identification section 204 identifies the type of the picture section 914 (which one of a plurality of picture sections 914) from the code image 20 identified by the invisible-code identification section 202.

The photographed-position identification section 206 identifies the relative photographed position in the image of the picture section 914 being photographed.

More specifically, the photographed-position identification section 206 identifies the position in the picture section 914 from the code pattern identified by the invisible-code identification section 202, and identifies the orientation of the photograph with respect to the picture section 914 based on the orientation of the code image 20 projected. Based on this identified position and orientation, the photographed position (referred to as the photographed position or photographed range) is derived. Additionally, in this embodiment the focus distance of the imaging section 102 can be judged as fixed by the lighting-skirt section 938, the photographed position can be derived from the identified position and orientation.

The partial-image display control section 208 controls the image-display section 372 to display the partial image W2 (see FIG. 4) of the picture section 914 corresponding to the photographed position identified by the photographed-position identification section 206.

When the photographed position identified by the photographed-position identification section 206 satisfies the position condition for the display of the designated special image, the special-image display-control section 210 controls the image-display section 372 to display, on the partial image W2, the special image corresponding to the picture section 914 identified by the photographic picture identification section 204. Furthermore, in this embodiment in order to variably control the special images based on the clocking information, the image-selection section corresponding to the current time and date 212 and the image-selection section corresponding to the elapsed time 214 are provided as the image-selection section corresponding to clocking information.

In this embodiment, it is judged that the position condition is satisfied when the specific range 32 surrounding the observation object 30 is included in the photographed image (conversely when the center position coordinates of the photographed image is within the specific range 32). Then, the image-selection section corresponding to the current time and date 212 selects the image element that will be the special image to be displayed corresponding to the current time and date (see FIG. 6). The image-selection section corresponding to the elapsed time 214 selects the image elements that will be the special images to be displayed corresponding to the elapsed time starting with the first time/date the position condition is satisfied (the first time/date the observation object 30 becomes the target of photographing) to now (see FIG. 5).

The special-image display history memory control section 220 controls the memory section 500 to store the history of the special images displayed by the image-display section 372.

The record-display control section 222 controls the image-display section 372 to display the record-display screen W8 (see FIG. 7), and to display the special images displayed in the past based on the history stored by the special-image display history memory control section 220.

The clock section 226 clocks the time and date. The clock section 953 in FIG. 2 falls under this.

The image generation section 272 is implemented by, for example, the processors such as GPU and the digital signal processor (DSP), the programs and circuits such as the video signal controller and the video codec, and the semiconductor memories for drawing frames such as the frame buffer.

In accordance with controls and instructions from the partial-image display control section 208, the special-image display-control section 210 and the record-display control section 222, the image generation section 272 creates one sheet of an image within the designated frame time (1/60 second for example), and outputs the image signal of the generated image to the image-display section 372.

Based on the image signals input from the image generation section 272, the image-display section 372 displays various images. The touch panel 942 in FIG. 2 falls under this.

The memory section 500 stores in memory various programs and data for the control section 200 to implement the various functions in order to integrally control the handy loupe-type device 930. Additionally, it is used as the working area of computation processes of the control section 200, and it stores temporarily in memory the various computation results of the control section 200 executing various programs, the input data from the operation input section 100, and image data input from the imaging section 102. These functions can be implemented by, for example, the semiconductor memories such as RAM or ROM, the electromagnetic disk such as a hard disk, and the optical disk such as CR-ROM or DVD. The IC memory 952 or the semiconductor built in the SoC 951 mounted on the control board in FIG. 2 fall under this.

FIG. 9 is a diagram that illustrates programs and data stored in the memory section 500 of this embodiment. In the memory section 500 of this embodiment, the system program 501, the handy device-control program 502, the picture-section identification definition data 510, the picture-section definition data 520, and the special-image definition data 530 are stored. In addition, as needed, the photograph target picture section ID 550, the photographed position definition data 552, the special-image display history data 560, the timer and counter for clocking, various flags and other information are stored in memory.

The system program 501 is the basic program for the handy loupe-type device 930 to implement the basic function as a computer such as the input/output function.

The handy device-control program 502 allows the control section 200 to implement various functions such as the invisible-code identification section 202.

The picture-section identification definition data 510 is prepared separately for each picture section 914 of the main body 910. Each picture-section identification definition data 510 stores information of the various code images included in the picture section 914 (such as the code pattern, the position embedded (printed) in the picture section, and the orientation), and the picture section ID to identify the picture section 914. Of course, other data can be appropriately stored, such as information of layout rules when changing the layout rules of the code images separately for each picture section 914.

The picture-section definition data 520 is prepared separately for each picture section 914 of the main body 910, and defines each picture section 914. Each picture-section definition data 520 contains, as shown in FIG. 10 for example, the picture section ID 521, the picture-image data 522, and the special-image ID 524 linked to the corresponding special-range definition data 523. Of course, other data can be stored appropriately.

The picture-image data 522 has the same image coordinate system as the corresponding picture section 914, and is the data to display the same content. In this embodiment, this is the two-dimensional image data.

The special-range definition data 523 defines the specific range 32 separately for each observation object 30 set in the corresponding picture section 914 (see FIG. 3). The specific range 32 of this embodiment is a rectangular region, and therefore the coordinate of each of the four corners of the rectangular region in the image coordinate system of the picture-image data 522 will be stored.

The special-image ID 524 indicates the special image that would correspond to the observation object 30 and its specific range 32.

The special-image definition data 530 shown in FIG. 9 is prepared for each special image and defines the configuration of the special image. Each special-image definition data 530 includes, as shown in FIG. 11 for example, the special-image ID 531, the image-element display-based point coordinate 535, the image-element ID 541 linked to the corresponding display condition 540, and the image-element data 543. Of course, any other data can be stored appropriately.

The image-element display-based point coordinates 535 define the standard position for the display of the special image in the image of the picture section 914.

The display condition 540 is for the display of the corresponding image-element data 543. As described earlier, in this embodiment there are two types of display conditions. One type sets the elapsed time starting with the first time/date when photographed (see FIG. 5). The second type sets the condition of time/date for which the current photographed time/date is compared (see FIG. 6).

The image-element data 543 defines the image element, which has the same size as the specific range 32. The no. 1 image element W41 through no. 4 image element W49 in FIG. 5, and no. 1 image element W61 and no. 2 image element W62 in FIG. 6 are defined by this data. When displayed based on the image-element display-based point coordinates 535, the image element just covers the specific range 32.

The photograph target picture section ID 550 in FIG. 9 stores the picture section ID of the picture section 914 that is currently being photographed.

The photographed position definition data 552 stores the information for use in defining the relative photographed position, that is to say the photographed portion, in the image of the picture section 914 that is currently being photographed. The photographed position definition data 552 of this embodiment contains the photographed image center position coordinate 554, the rotational angle 556, and the range four corners coordinate list 558 that indicates the position coordinates of four corners of the photographed range.

In this embodiment, the handy loupe-type device 930 is used in which the lighting-skirt section 938 touches the page 912, and it is maintained in the designated relative posture in such a way that the light axis L of the camera module 955 will be perpendicular or almost perpendicular with respect to the printed surface of the picture section 914. Therefore, the rotational angle 556 will be limited to the rotational components around the perpendicular axis (the roll angle around the light axis L). However, in the configuration which does not have the lighting-skirt section 938, the relative posture with respect to the page 912 is not necessarily constant. Therefore, in addition to the roll angle around the light axis L, the pitch angle and the yaw angle may be added.

Whenever the special image is displayed, the special-image display history data 560 coordinates with the display time/date 561 for time stamping, and stores the special-image ID 563 of the displayed special image and the image-element ID 565 of the special image. All history in the special-image display history data 560 can be erased when a designated history delete operation is performed.

Explanation of the Flow of the Process

FIG. 12 is a flow chart describing the flow of the process in the handy loupe-type device 930.

The control section 200 judges whether or not the code image 20 is included in the image photographed by the camera module 955 (step S2).

If it is included (YES in step S2), the control section 200 identifies the type of picture section 914, which is being photographed, based on the code pattern of the code image 20 in the photographed image (step S4). Then, the picture section ID of the identified picture section 914 will be set in the photograph target picture section ID 550 (see FIG. 9).

Next, the control section 200 specifies the photographed position in the image of the identified picture section 914 (step S8). More specifically, based on the code pattern and the position and orientation in the photographed image in which the code image 20 is projected, the control section 200 specifies which portion of the picture section 914 is being photographed and the photographed angle (roll angle: at a clockwise or counter-clockwise angle with respect to the photographed direction), and then it computes the coordinates of the four corners of the photographed range.

Then, based on the picture-image data 522 of the picture-section definition data 520, which has the picture section ID 521 (see FIG. 10) matching the photograph target picture section ID 550, the control section 200 controls the touch panel 942 to display the partial image corresponding to the photographed position (step S10).

If all or a portion of the specific range 32 is included in the photographed image (the photographed range), the position condition for the display of the special image is judged as satisfied (YES in step S32), and then the control section 200 selects the special image corresponding to applicable specific range 32 (step S32), and displays it on the screen, being overlaid on the partial image being displayed in step S10.

More specifically, for each specific range 32 defined by the special-range definition data 523 (see FIG. 10), it is judged whether all or a part of the specific range 32 is included in the photographed range indicated by the photographed position definition data 552.

If included, the special-image definition data 530, which matches the special-image ID 524 corresponding to the applicable special-range definition data 523, will be referenced (see FIG. 11). Then, the applicable conditions in the display condition 540 of the referenced special-image definition data 530 will be searched, and the image-element data 543 corresponding to the applicable display condition 540 will be selected and read out. Based on the image-element display-based point coordinates 535, the image element will be displayed on the partial image that is being displayed on the screen in step S10. As described earlier, the image element defined by the image-element data 543 has the same size as the specific range 32 surrounding the observation object 30, and is displayed on top of that. Consequently, in the screen display of the touch panel 942 it appears as if the state of the observation object 30 has changed.

Next, the control section 200 stores in memory the display history of the special image (step S36).

That is to say, the current time/date is set as the new display time/date 561 in the special-image display history data 560 (see FIG. 9). In the image-element ID 565 corresponding to the new display time/date, the image-element ID 541 of the image-element data 543 displayed in step S34 is stored (see FIG. 11). The special-image ID 531 is set to the special-image ID 563 (see FIG. 11).

When the start-operation for the designated record display is detected (YES in step S50), the control section 200 controls the touch panel 942 to display the record-display screen W8 (see FIG. 7) (step S52).

Then, the special images displayed in the past are displayed by the record-display section 42 in response to the selection operation at the menu-display section 40 (step S54). More specifically, the image-element ID 565 corresponding to the special-image ID 563 having the same ID as the image-element data 543 corresponding to the thumbnail placed on the designated position (on the specified-position display section 41) will be read out and displayed by the record-display section 42.

When the termination-operation of the designated record display is detected (NO in step S56), the display of the record-display screen W8 will be canceled (step S58)

On the other hand, if the code image 20 is not projected in the photographed image in step S2 (NO in step S2), it is judged that the photograph is not taken properly (it is photographed without the lighting-skirt section 938 touching the picture section 914) and the photographed image is deleted, and then a designated display is shown on the screen informing the photograph is not taken properly and therefore nothing is displayed on the screen (step S60).

The information presentation program related to this invention operates the computer equipped with the imaging section (the camera module 955, for example) and the display section (the touch panel 942, for example). This information presentation program allows the computer to function as the display image data memory means, thereby storing in memory the display-image data (the picture-image data 522, for example); the photographed-position identification means that identifies the photographed position in the information section based on the image recognized by the imaging section when the imaging section recognizes the image listed in the information section (the picture section 914, for example); and the partial-image display control means that lets the display section control the display of the partial image based on the partial-image data that is generated from the display-image data memorized in the display-image data memory means based on the photographed position identified by the photographed-position identification means. In this information presentation program, the contour of the partial image matches the whole or a part of the contour of the image recognized by the imaging section.

In this embodiment, when the picture image in the picture section is observed (photographed) using the handy device, the partial image corresponding to the range being photographed within the picture image is displayed in the display section of the handy device. For example, if the picture image is a photograph of an insect, one can experience a pseudo-observation as if one is observing an inset with the handy device. Also by displaying only the image data stored in the memory section, the code image, which is normally displayed in the display section, will not be displayed in the display section. Therefore, it is not necessary to worry about code images being projected in the display section. This will enhance the freedom of designing the picture image and code image in the picture section.

In this embodiment, it is possible to display the special image, which is not drawn on the picture section, on the image displayed in the display section of the handy device. In other words, it is possible to provide an experience of "seeing on the screen the object that cannot be seen with the naked eye." As described earlier, this type of experience gives a strong impression. Even though this is a pseudo-experience, this will impress children in terms of joy of "observing", and will be very effective in the intellectual training of children.

Furthermore, in this embodiment the content of the special image can be varied according to the time/date of observing (photographing) the picture section by the handy device, and depending on the elapsed time from the time starting the observation. For example, if the special images that can only be seen during a designated time frame (early morning, for example) are prepared and if a child is able to see them, then the child may learn the importance of keeping the observation time.

Furthermore, in this embodiment one can see the observation record later and can experience the act of pseudo-observing.

Furthermore, in this embodiment the content of display of the display section varies depending on the observing (photographing) position in the picture section. Therefore, this may build up enthusiasm in children to observe from corner to corner of the picture section.

Furthermore, in this embodiment the photographed position can be derived from the relative position relationship between code images. This method has much less computational load than the configuration in which the photographed position is derived by analyzing portion to portion of the picture image using image-recognition technology. In implementing the control section, it is not necessary to employ the computational device with high processing capability, and the manufacturing cost of the handy device can be reduced.

Furthermore, in this embodiment by designing the handy device resembling a "loupe," which is a typical item for observation, it enhances the ambience of the observation act even though it is a pseudo-experience.

As described above, in this embodiment when the user places the handy loupe-type device 930 above the picture section 914 as if to observe the target with the loupe and peers into the window 940, the user can see the scene of the observation target 30 changing by the elapsed time or the particular time/day. Thus, this embodiment can offer a pseudo-experience in which new discoveries are made by observing over time or observing at a different time/day. The content of the observation target 30 can be set to various fields and topics ranging with, understandably, the natural science field to the home-cooking process. Thereby, users can be offered pseudo-experience over a wide range of areas.

Another Variation

It should be noted that embodiments of this invention are not limited to the aforementioned embodiments, and configuration elements can appropriately be changed, added or deleted.

For example, the configuration of the handy loupe-type device 930 is not limited to the dedicated design device as described in the above embodiment. It can be implemented by storing the handy device-control program 502 (see FIG. 9), the picture-section identification definition data 510, the picture-section definition data 520 and the special-image definition data 530 into memory of a portable electronic device such as a smart phone or a tablet, and by executing the handy device-control program 502 as an application. However, in this configuration, the part equivalent to the lighting-skirt section 938 cannot be prepared. Therefore, it can be implemented by controlling to display the image or the special image of the picture section 914 only when taking a designated close-up photograph (when the photo distance is appropriate). More specifically, the process steps beyond step S6 are executed only when the code image 20 is correctly identified in step S2. Certainly it is acceptable to provide, separately to the portable electronic device, a detachable part equivalent to the lighting-skirt section 938, which can be worn during use.

Additionally, in the above embodiment the example of the toy system meant for children is explained, but it should not be so limited. For example, it is possible to apply to the information presentation system that executes content for adults.

LIST OF REFERENCE SIGNS

20 Code image
30 Observation target
32 Specific range
40 Menu-display section
41 Specified-position display section
42 Record-display section
43 Thumbnail
44 Record-display termination operation icon
102 Imaging section
200 Control section
202 Invisible-code identification section
204 Photographic picture identification section
206 Photographed-position identification section 208 Partial-image display control section
210 Special-image display-control section
212 Image-selection section corresponding to the current time and date
214 Image-selection section corresponding to the elapsed time
220 Special-image display history memory control section
222 Record-display control section
226 Clock section
372 Image-display section
500 Memory section
502 Handy device-control program
510 Picture-section identification definition data
520 Picture-section definition data
522 Picture image data
523 Special-range definition data
530 Special-image definition data
540 Display condition
543 Image-element data
550 Photograph target picture section ID
552 Photographed range (position) definition data
554 Photographed image center position coordinate
556 Rotational angle
558 Range four-corner position coordinates list
560 Special-image display history data
561 Display time/date
563 Special-image ID
565 Image-element ID
900 Toy system
910 Main body section
914 Picture section
930 Handy loupe-type device
938 Lighting-skirt section
940 Peep window
942 Touch panel
950 Control board
951 SoC
952 IC memory
953 Clock section
955 Camera module
W2 Partial image
W41 No. 1 image element
W43 No. 2 image element
W46 No. 3 image element
W49 No. 4 image element
W61 No. 1 image element
W62 No. 2 image element
W8 Record-display screen

The invention claimed is:

1. An information presentation system comprising:
an information-section comprising a printed page containing at least one image, and
a handheld electronic device comprising a controller, an imaging device, a display device, and a non-transitory memory wherein the handheld electronic device is operable by a user,
wherein the imaging device is configured to recognize at least a portion of the image included in the information section when the handheld electronic device is positioned adjacent the portion of the information section,
wherein the non-transitory memory stores image data corresponding to at least a portion of the image included in the information section, and
wherein the controller is configured to (1) track a position of the recognized portion of the image relative to the entirety of the image of the information section as the imaging device is moved relative to the image of the information section, (2) extract from the non-transitory memory a portion of the image data matching the recognized portion of the image of the information section, and (3) control the display device to display a partial image matching the contour of the recognized portion of the image of the information section, wherein the partial image is selected from the extracted portion of the image data stored in the non-transitory memory and the partial image contains a special image selected for display based at least in part on a sequence of special images for display via the display device.

2. The information presentation system according to claim 1, wherein the controller displays the special image on the partial-image displayed in the display device when the position of the recognized portion of the image satisfies a position condition for the display of the designated special image.

3. The information presentation system according to claim 2, wherein the handheld electronic device is equipped with a clock, and the controller varies the special image based on clocking information from the clock.

4. The information presentation system according to claim 2, wherein the controller stores in the memory a history of the special images displayed in the display device, and based on the history the controller causes the display device to display the special images displayed in the past in the display device.

5. The information presentation system according to claim 1, wherein in the information section, each portion of the image is unique.

6. The information presentation system according to claim 1, wherein the image of the information section comprises code images embedded according to designated layout rules, and wherein the code images are invisible to the naked eye.

7. The information presentation system according to claim 1, wherein the handheld electronic device has a loupe shape having a peep window therein, and wherein the display device is provided at the peep window.

8. An information presentation program stored in a non-transitory computer readable medium operating on a handheld computer, the handheld computer comprising:
an imaging device,
a non-transitory memory, and
a display device,
wherein, the information presentation program causes the handheld computer to:
recognize, via the imaging device, at least a portion of an image included in an information section of a printed page when the imaging device is positioned adjacent the portion of the information section,
track a position of the recognized portion of the image in the information section as the imaging device is moved relative to the image of the information section based on the recognized portion of the image when the imaging device recognizes information included in the information section, wherein the imaging device is operable by a user,
extract from image data stored in the non-transitory memory, a portion of the image data matching the recognized portion of the image in the information section, and
display, via the display device, partial-image data matching the contour of the recognized portion of the image of the information section, wherein the partial image is selected from the extracted portion of the image data stored in the non-transitory memory and the partial image contains a special image selected for display based at least in part on a sequence of special images for display via the display device.

9. The information presentation program stored in a nontransitory computer readable medium operating on a handheld computer according to claim 8, wherein the information presentation program additionally causes the handheld computer to:
 identify a position condition of the position of the recognized portion of the image, and
 display the special image on the partial-image displayed in the display device when the position condition satisfies a criteria to display the special image.

10. The information presentation program stored in a nontransitory computer readable medium operating on a handheld computer according to claim 9, wherein the handheld computer additionally comprises a clock, and
 wherein the information presentation program additionally causes the handheld computer to control variable display of a plurality of special images based on clocking information generated by the clock.

11. The information presentation program stored in a nontransitory computer readable medium operating on a handheld computer according to claim 9, wherein the information presentation program additionally causes the handheld computer to:
 store a history of special images displayed in the display device in the memory, and
 control display of past displayed special images in the display device based on the history.

12. The information presentation program stored in a nontransitory computer readable medium operating on a handheld computer according to claim 8, wherein the handheld computer identifies the position of the recognized portion of the image by matching a pattern of the recognized portion of the image with image data stored in the memory.

13. The information presentation program stored in a nontransitory computer readable medium operating on a handheld computer according to claim 8, wherein the handheld computer identifies the position of the recognized portion of the image based at least in part on code images included in the image of the information section, wherein the code images are invisible to the naked eye.

* * * * *